UNITED STATES PATENT OFFICE.

PAUL THOMASCHEWSKI, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

1,044,603.  Specification of Letters Patent.  Patented Nov. 19, 1912.

No Drawing.   Application filed March 26, 1912.   Serial No. 686,349.

*To all whom it may concern:*

Be it known that I, PAUL THOMASCHEWSKI, doctor of philosophy, chemist, a citizen of the German Empire, residing at Vohwinkel, near Elberfeld, Germany, have invented new and useful Improvements in Vat Dye, of which the following is a specification.

I have found that new and valuable coloring matters dyeing cotton from the alkaline hydrosulfite vat generally from yellow to orange to red shades can be obtained by condensing a chloroanthraquinone compound with anthraquinone marcaptans, the chloroanthraquinone containing another anthraquinone radical than the anthraquinone mercaptan.

The new dyes being thioethers having most probably the formula:

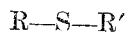

(R and R' meaning two different anthraquinone radicals) are from yellow to red crystalline powders soluble in concentrated sulfuric acid generally with from a yellow to blue to green coloration.

In order to illustrate the new process more fully the following example is given, the parts being by weight:—10 parts of anthraquinone-2-mercaptan and 15 parts of 1-benzoylamino-4-chloroanthraquinone are boiled together with 10 parts of carbonate of potassium and 100 parts of naphthalene during 6 hours. The new thioether is then precipitated with pyridin or alcohol. The precipitate is filtered off, washed with alcohol and water.

The 4'-benzoylamino-1.2'-dianthraquinonylthioether having most probably the formula:

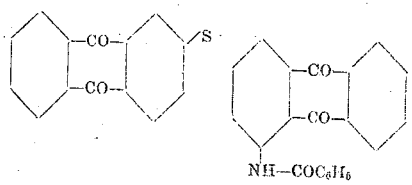

is after being dried and pulverized a red powder crystallizing from nitrobenzene in the shape of scarlet-red needles which are soluble in concentrated sulfuric acid with a green coloration and dyeing cotton from an alkaline hydrosulfite vat yellowish-red shades fast to chlorin and to light.

Other chloroanthraquinones or other anthraquinone mercaptans may be used. The dye obtained from 1-chloroanthraquinone and anthraquinone-2-mercaptan dyes yellow, that obtained from anthraquinone-2-mercaptan and 1.4-bromo-anthrapyridon dyes yellowish-red.

I claim:—

1. The herein described new vat dyes being thioethers of the anthraquinone series having most probably the formula:

(R and R' meaning two different anthraquinone radicals) being soluble in concentrated sulfuric acid with from a yellow to blue to green coloration; and dyeing cotton from the hydrosulfite vat generally from yellow to orange to red fast shades, substantially as described.

2. The herein described new vat dye being the 4-benzoylamino-1.2'-dianthraquinonylthioether having most probably the formula:

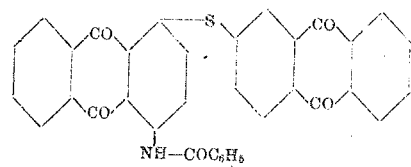

which is after being dried and pulverized a red powder crystallizing from nitrobenzene in the shape of scarlet-red needles which are soluble in concentrated sulfuric acid with a green coloration; and dyeing cotton from an alkaline hydrosulfite vat yellowish-red fast shades, substantially as described.

In testimony whereof I have hereunto set my hand in the presence of two subscribing witnesses.

PAUL THOMASCHEWSKI. [L. S.]

Witnesses:
 HELEN NUFER,
 ALBERT NUFER.